Patented May 19, 1931

1,805,712

UNITED STATES PATENT OFFICE

CHARLES E. BRADLEY AND CONRAD FERRETTIE, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA

RUBBER TREATING PROCESS AND PRODUCT

No Drawing.      Application filed December 8, 1925. Serial No. 74,198.

Our invention relates to the preparation of rubber so as to improve its character for manufacturing purposes, and has reference more particularly to the method of treating the crude rubber, and the product resulting from such treatment, wherein the rubber is suitably softened to improve its milling, blending and calendering properties and to provide a finished product of improved quality.

Crude rubber is broadly classified into two divisions, namely wild and plantation, and in each of these divisions there are various grades or qualities, some classified as hard and others as soft. No satisfactory method has been found heretofore for conditioning crude rubber to insure a fine homogeneous texture or uniform blending of these rubbers in compounding and in the manufacture of rubber goods, therefore, the quality and texture of the finished product depends largely upon the class and grade of crude rubber employed.

In practice, the most satisfactory quality and texture is obtained by mixing varying quantities of soft rubber with the hard, wild Pará rubber preferably being used in the compound, and particularly in certain classes of goods where finer quality and smooth finished surfaces are desired, as the wild para works up into a more uniform and homogeneous texture than the plantation rubber. This is particularly important in products such as rubber footwear wherein the articles are fashioned from calendered sheets of rubber compound, as the smooth surface of the finished article depends, not upon moulding operations, but upon the character and condition of the rubber in the compound.

It is becoming more and more difficult, however, to obtain supplies of satisfactory wild rubber, and there is therefore an urgent need especially in making high grade calendered rubber goods, to adapt plantation rubber so that it may be satisfactorily used as a substitute for wild rubber, and in general to facilitate the blending and improve the quality and texture of rubber compounds.

This we have accomplished with our present invention by a treatment of the rubber whereby it blends uniformly and affords a fine homogeneous texture without impairing the other desired qualities of the rubber such as tensile strength, wear and aging, and it is possible by using our method to condition plantation rubber so that it is a satisfactory substitute for wild Pará rubber. Our process also has the further advantage that it shortens the milling operations.

The principal objects of our invention are, to condition rubber so that it is better adapted for manufacturing purposes; to improve the milling, blending and calendering properties thereof; to avoid the necessity of using wild rubbers for obtaining the desired texture and finished surface for rubber articles; to produce a soft grade of plantation rubber which may be used alone or in compound with hard plantation rubber to improve the quality and finished surface of rubber articles made therefrom; and in general to provide a simple and convenient method of treating crude rubber and a resulting product wherein improved milling, blending and calendering properties and uniform homogeneous texture of finished products are obtained.

In carrying out our process, first grade plantation rubbers such as first latex crepe or smoked sheet is steeped for 24 hours in water at a temperature around 150 to 175 degrees Fahrenheit. By this step the rubber is swollen and whitened from the water taken up which amounts to 20 to 30 per cent by weight on the rubber. After this treatment the resulting swollen crude rubber is then sheeted, placed in a vulcanizer on racks and is then subjected to 25 to 50 pounds of live steam for one to two hours. This subjects the rubber to a temperature between 267 degrees and 297 degrees Fahrenheit. It is then removed and dried in a vacuum drier at a temperature of from 15 to 25 pounds steam, or it may be dried in an ordinary rubbe. dry kiln.

We have discovered that rubber when swollen with water is particularly susceptible to heat and when a rubber thus swollen is heated under the above outlined conditions the "nerve" or "kick" of the crude rubber is materially reduced and a product is obtained which is more plastic and greatly improved in texture and calendering qualities. It is not sufficient to steam the dry crude rubber as swelling with water preliminary to steaming is essential in obtaining the desired softening action. In general the amount of softening is proportional to the time of heating and if particularly soft rubbers are desired, longer heating may be used. Moreover we have found that when the rubber is thoroughly wet the relaxation of the steam pressure preparatory to drying causes a sponging action to take place and affords an open texture permitting the rubber to dry more rapidly.

It is preferred to use steam as a heating agent and to avoid presence of air in the heating process as high temperature air has an undesirable oxidizing effect on rubber. Moreover the desired wet condition of the rubber is also maintained during the heating with steam, and the undesirable drying action of heated air on the rubber is avoided. It is suggested, therefore, that if the rubber is heated otherwise than by the steam heating process described above, it would be desirable to place the wet rubber in a closed container, minimize the exposure of the rubber to air, and then heat the container so as to subject the rubber therein to the required temperature.

This principle of preparing first grade good calendering rubber would be adaptable to plantation practice and the heat could be applied there while the rubber was in the wet condition without utilizing the steeping operation.

The tensile, wear and aging qualities of rubber compounds made from crudes softened by this process are approximately the same as those prepared from the same rubbers not treated. In other words the good qualities of the crude are largely retained by this treatment which at the same time greatly improves the milling and calendering properties of the rubber.

Rubber compounds may be made with this softened rubber in the usual manner, by blending, for example, 20 to 30 per cent of the softened rubber with crude rubber of the hard quality, and this gives a compound having milling and calendering properties which have been obtainable heretofore only by using soft wild rubbers which it is now becoming very difficult to procure. The rubber may be softened to a greater or less degree by varying the length of time it is heated as above suggested, so as to give the desired softness for the particular purpose for which the rubber is to be used, and the percentage of soft rubber used in the mixture may be varied accordingly. In fact the rubber may be properly softened so that 100 per cent of soft rubber is used instead of mixing a quantity of hard rubber therewith.

If it is desired to accelerate the softening of the rubber or to obtain a special soft grade of crude rubber, we have found that this may be accomplished by incorporating a softener in the rubber before it is subjected to the softening process above described.

The softeners commonly used in rubber compounding include coal tar, pine tar, resins, waxes, oils, etc. and these may be used in varying proportions running as high as five per cent. One per cent of rosin gives very satisfactory results, this amount of rosin being thoroughly incorporated in the rubber, after which the resulting resinated rubber is first steeped in heated water, then subjected to heating, preferably by direct application of steam under pressure and then dried, all in accordance with the process above described. The addition of the rosin or other softening agent accelerates the softening action of the steam and makes it possible to obtain a thorough softening of the rubber to the desired extent in a shorter period of heating or a softer grade of rubber may be obtained.

While we have described the preferred manner of carrying out our invention we are aware that various changes and modifications may be made without departing from the principles of our invention the scope of which is to be determined by the appended claims.

We claim:

1. The method of softening rubber which comprises heating water soaked crude rubber for approximately an hour or more at a temperature above the boiling point of water while maintaining the rubber in the water-soaked condition.

2. The method of softening rubber, which comprises subjecting crude rubber containing at least ten percent of moisture to heat above the boiling point of water and pressure above atmospheric while substantially preserving such moisture therein, and then drying the rubber.

3. The method of softening rubber, which comprises heating a water soaked compound of crude rubber and a softening agent.

4. The method of improving the milling and calendering properties of rubber which comprises preparing crude rubber with a moisture content in excess of ten percent, then subjecting the rubber in a closed container for approximately an hour or more to substantially 25 to 50 pounds of live steam, and then drying the rubber.

5. The method of improving the milling and calendering properties of rubber which comprises steeping crude rubber for substantially 24 hours in water at a temperature around 150 to 200 degrees Fahrenheit, then subjecting the resulting rubber in a closed container to substantially 25 to 50 pounds of live steam, and then drying the rubber.

6. The method of improving the milling and calendering properties of plantation rubber which comprises first swelling the rubber by steeping in water, then softening the rubber by heat, and then drying the rubber.

7. The method of improving the milling and calendering properties of plantation rubber, which comprises first soaking the rubber in heated water, then softening the rubber by heating the rubber under conditions which preserve the moisture in the rubber during the heating, and then drying the rubber.

8. The method of producing calendered sheets of rubber which comprises swelling crude rubber in hot water, then heating the resulting swollen rubber with live steam, then drying the rubber and then calendering the dried rubber.

9. The method of producing calendered sheets of rubber which comprises steeping first grade plantation rubber for approximately 24 hours in water at a temperature around 150 to 175 degrees Fahrenheit, then sheeting and racking the resulting rubber and exposing same for approximately one to two hours to live steam at 25 to 50 pounds pressure, then drying the sheeted rubber and then subjecting the rubber to calendering rolls.

10. A rubber product obtained by subjecting crude rubber while it retains a substantial amount of moisture in excess of hydroscopic and condensation moisture to heat substantially in excess of the boiling point of water and pressure substantially in excess of atmospheric without substantial drying and thereafter drying the rubber.

11. A rubber product for making calendered sheets comprising crude rubber swollen in hot water and then successively heated and dried.

12. A rubber product for making calendered sheets comprising plantation crude rubber in the form resulting from first steeping the crude rubber in hot water, then softening under heat and then drying.

13. A rubber product comprising plantation crude rubber having the properties, obtained by first uniformly saturating the crude plantation rubber with water, then subjecting the saturated rubber for approximately one to two hours to live steam at 25 to 50 pounds of pressure, and then drying the rubber.

14. Plantation rubber having improved calendering and milling properties obtained by subjecting the crude rubber with a moisture content in excess of ten per cent to steam and pressure for substantially an hour or more.

15. The method of softening rubber which comprises subjecting rubber uniformly impregnated with moisture substantially in excess of hydroscopic and condensation moisture for a substantial length of time to a heated atmosphere while preserving said uniform moisture impregnation of the rubber.

16. The method of softening rubber which comprises subjecting rubber uniformly impregnated with moisture substantially in excess of hydroscopic and condensation moisture for a substantial length of time to a heated atmosphere substantially devoid of air and at the same time preserving said moisture in the rubber.

17. The method of softening rubber which comprises subjecting rubber uniformly impregnated with moisture substantially in excess of hydroscopic and condensation moisture for a substantial length of time to steam and pressure and at the same time preserving said moisture in the rubber.

18. The method of softening rubber which comprises subjecting rubber uniformly impregnated with moisture substantially in excess of hydroscopic and condensation moisture for a substantial length of time to a heated atmosphere at a pressure substantially above atmospheric while preserving said uniform moisture impregnation of the rubber.

19. A rubber product obtained by subjecting rubber uniformly impregnated with moisture substantially in excess of hydroscopic and condensation moisture for a substantial length of time to a heated atmosphere while preserving said uniform moisture impregnation of the rubber.

20. A rubber product obtained by subjecting rubber uniformly impregnated with moisture substantially in excess of hydroscopic and condensation moisture for a substantial length of time to a heated atmosphere substantially devoid of air and at the same time preserving said moisture in the rubber.

21. A rubber product obtained by subjecting rubber uniformly impregnated with moisture substantially in excess of hydroscopic and condensation moisture for a substantial length of time to steam and pressure and at the same time preserving said moisture in the rubber.

22. A rubber product obtained by subjecting rubber uniformly impregnated with moisture substantially in excess of hydroscopic and condensation moisture for a substantial length of time to a heated atmosphere at a pressure substantially above atmospheric while preserving said uniform moisture impregnation of the rubber.

CHARLES E. BRADLEY.
CONRAD FERRETTIE.